United States Patent Office 3,454,322
Patented July 8, 1969

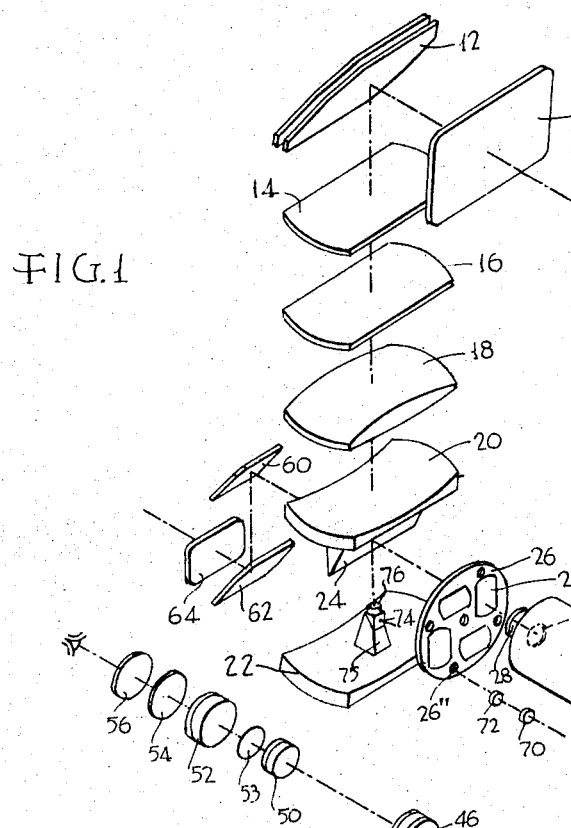
FIG.1
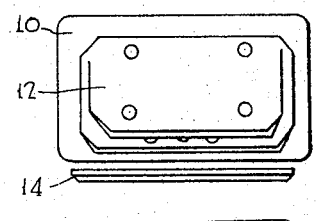
FIG.2
INVENTORS:
Wright H. Scidmore
Ezra Weitzel
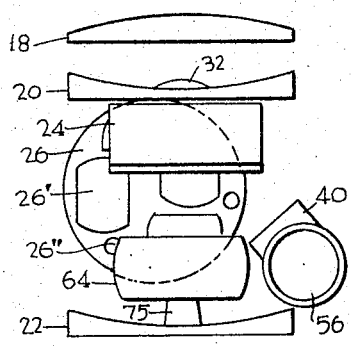
ATTORNEYS

3,454,322
CATADIOPTRIC SYSTEM FOR NIGHT PERISCOPIC SIGHT
Wright H. Scidmore, Langhorne, and Ezra Weitzel, Philadelphia, Pa., assignors to the United States of America as represented by the Secretary of the Army
Filed Mar. 7, 1967, Ser. No. 621,744
Int. Cl. G02b *17/08*
U.S. Cl. 350—55                                  1 Claim

ABSTRACT OF THE DISCLOSURE

Specific and suitable lens and component values are prescribed for a catadioptric system for use in a compact periscope possessing high power night sighting capabilities as well as unaided binocular day vision.

---

This invention relates to optical instruments and more particularly concerns a compact periscopic optical instrument having high power night sighting capabilities coupled with means for unaided binocular day vision.

The inventive periscope described herein consists of two major assemblies, the head assembly and the body assembly. The head assembly provides a large entrance aperture and the means for elevating and depressing the field of view. The body assembly houses a large aperture optical system to pass as much of the available light as possible, an image intensifier tube, an optical system to view the tube screen, a reticle projector system to superimpose a ballistic reticle pattern on the target image, and a unity power optical system for direct "day" viewing. The present catadioptric system is herein described as utilized in a periscope designed for use under widely different levels of illumination. This periscope is disclosed and claimed in a copending application of Wright H. Scidmore and James W. Shean, Ser. No. 621,745, filed Mar. 7, 1967 for "Optical System for Periscopic Night Sight," but does not claim the catadioptric system of the present invention.

The head assembly comprises a housing that contains two windows and an articulated head mirror. This articulated head mirror provides the means for an 18-degree depression and a 22-degree elevation of the line-of-sight. The head mirror is moved by an internal mirror drive system, which is coupled to the gun trunnion by means of the parallelogram-type linkage. This shaft and linkage arrangement insures that the periscope line-of-sight will be synchronized with the gun in elevation and depression.

The body assembly contains the catadioptric optical system which forms an image of the scene on the photocathode surface of the image intensifier tube and an optical system to view the tube screen. The optical system has nine power magnification and six degrees field of view. A ballistic reticle pattern is projected into the catadioptric optical system of the body by the reticle projector. Borsesight adjustment is provided in the reticle projector.

The optical systems of our inventive periscope comprise the unity power "day" system, the nine-power "night" system, and the optical system for the reticle projector. The head assembly contains elements common to the unity power and nine-power optical systems. In the nine-power optical system, all light transmitting and reflecting elements with the exception of the elements used for reticle projection, and the elements of the image intensifier tube, are coated with high-efficiency reflection reducing or enhancing films, as appropriate, to increase the light transmission through the periscope. The coatings on the optical elements preceding the fiber optic surface of the image intensifier tube are such as to be optimum over the spectral range of the photocathode surface.

The aforementioned provides a general description of our periscopic tank sight capable of use under low levels of illumination, the periscope being compact and yet usable with a 3-stage image intensifier tube. Prior art telescopic tank sights providing night vision and unity power capabilities were, for the most part, usable only with single stage intensifier tubes which were short in length and having a curved photocathode. The 3-stage image intensifier tube is about three times as long as its single stage counterpart, has a flat cathode and is capable of much greater light amplification.

The exact nature of this invention and advantages thereof will be readily apparent from consideration of the following description and drawings wherein:

FIG. 1 illustrates a diagrammatic view of the optical system of our inventive periscope.

FIG. 2 illustrates another view of the optical system with components omitted for the sake of clarity.

The optical system depicted in the drawings includes a head assembly comprising an entrance window 10 through which light enters, is reflected from articulating head mirror 12 and transmitted through head assembly exit window 14 to the body assembly. Entrance window 10 is merely a plane parallel glass plate sealing the entrance aperture of the head assembly against the entry of dirt, moisture, or other foreign matter. The fully aluminized glass plate head mirror 12 provides a means for scanning the field of view in elevation through +22 degrees and —18 degrees.

Light rays passing through exit window 14 which contribute to the formation of an image for night observation are transmitted through window 16, outer areas of corrector lenses 18 and 20, to primary objective mirror 22. Lens 20 has a 90° mirror-prism 24 cemented to its underside. Primary mirror 22 folds the optical path of the light rays back 180° and converges the rays to form an image, after being reflected on the hypotenuse surface of 90° mirror-prism 24 and transmitted through filter disc 26, window 28 and field-flattener lens 30 at the light sensitive surface of 3-stage image intensifier tube 32. Corrector lenses 18 and 20, in combination serve as a means of balancing aberrations of the objective mirror and field-flattener lens. Both corrector lenses, in combination with the objective mirror, 90° mirror-prism, filter disc, window and field-flattener lens comprise the catadioptric objective optical system.

Filter disc 26 is a plane parallel glass plate with four oblong apertures 26' having degrees of coatings varying from clear to near opaque for regulating the light falling on the photocathode surface of the intensifier tube. Reticle light will be transmitted through smaller complementary filter apertures 26" to maintain a constant ratio of intensity of the reticle pattern with respect to the target image and the photocathode surface of the image intensifier tube.

Rays from the visible image formed on the screen of the image intensifier tube are transmitted through a field-flattener lens 34, 90° prism 36, collective lens 38, Amici prism 40, and are collimated by first erector lenses 42 and 44. The rays are then focused at the eyepiece focal plane by second erector lenses 46 and 48 and focused at infinity by the eyepiece which consists of field lenses 50 and 52 having a diaphragm 53 therein between and serving as a field stop, center lens 54 and eye lens 56. Plus or minus 4 diopters adjustment is provided by longitudinal adjustment of the second erector lenses.

Light rays contributing to the unit power field are transmitted through window 16, the central portions of corrector lenses 18 and 20, are deviated 90° by (1) mirror surface of mirror-prism 24, (2) mirror 60 and (3) mirror 62 for transmittal through window 64 to the observer's eyes. Window 64 is a weak negative lens of approximately ½ diopter thereby requiring a small, desirable amount of eye accommodation when using the unit power vision system.

Light from reticle 70 (illuminated by a reticle lamp, not shown) is collimated by lens 72, is transmitted through an aperture 26″ in filter 26, and deviated 90° by prism 74, resting atop pedestal 75, into converging lens 76. Lens 76 converges the light to a focus at the light sensitive surface of 3-stage intensifier tube after being deviated 90° along the optical axis of the system by the mirror of mirror-prism 24 and transmitted through filter 26, window 28, and field-flattener lens 30. Lens 76, which is identical to lens 72, has a plane surface to permit cementing of this element to prism 74.

Filter disc 26 is manually rotatable and provides compensation for differing ambient levels of illumination of the target seen. For example, under full moon conditions, the opacity of oblong apertures 26′ of filter 26 will be greater than under, let's say, starlight conditions.

Mirror-prism 24 not only reflects the target, seen through window 64 after being reflected from mirrors 60 and 62 for binocular observation at unity power but also reflects energy from primary mirror 22 of the night system through the filter and into the image intensifier tube. It should be borne in mind that our inventive periscope includes no movable component for unaided binocular day vision.

Suitable characteristics for the various components of our optical system are tabulated below:

OBJECTIVE SYSTEM

| Component | Radius | Thickness | Glass Type |
|---|---|---|---|
| Corrector Lens (upper): | | | |
| Entrance Surface | 19,631 | .650 | 517–645. |
| Exit Surface | −62.700 | 1.792 | Air. |
| Corrector Lens (lower): | | | |
| Entrance Surface | −14.262 | .312 | 517–645. |
| Exit Surface | ±∞ | 6.353 | Air. |
| Primary Mirror | −18.000 | 7.878 | Air. |
| Filter: | | | |
| Entrance Surface | ±∞ | .250 | 517–645. |
| Exit Surface | ±∞ | .125 | Air. |
| Window (after filter): | | | |
| Entrance Surface | ±∞ | .120 | 517–645. |
| Exit Surface | ±∞ | .384 | Air. |
| Lens (by tube face): | | | |
| Entrance Surface | 1.954 | .250 | 517–645. |
| Exit Surface | 5.452 | .036 | Air. |
| Tube face: | | | |
| Entrance Surface | ±∞ | .075 | 487–700. |
| Exit Surface | ±∞ | .020 | Air. |

RETICLE PROJECTOR SYSTEM

| Component | Radius | Thickness | Glass Type |
|---|---|---|---|
| Reticle: | | | |
| Entrance Surface | ±∞ | .100 | 523–586. |
| Exit Surface | ±∞ | 6.303 | Air. |
| Lens (collimating): | | | |
| Entrance Surface | ±∞ | .159 | 523–586. |
| Intermediate Surface | −1.700 | .093 | 720–293. |
| Exit Surface | −2.702 | 3.045 | Air. |
| Prism (90° collimating): | | | |
| Entrance Surface | ±∞ | .600 | 517–645. |
| Exit Surface | ±∞ | 0.0 | Cement. |
| Lens (converging): | | | |
| Entrance Surface | ±∞ | .159 | 523–586. |
| Intermediate Surface | −1.700 | .093 | 720–293. |
| Exit Surface | −2.702 | 5.573 | Air. |

Filter, Window (after filter), Lens (by tube face), and Tube face values are given under Objective System above.

We claim:

1. A catadioptric system having optical components arranged in the order recited below and having numerical data as set forth in the following table wherein all dimensions are expressed in inches:

OBJECTIVE SYSTEM

| Component | Radius | Thickness | Glass Type |
|---|---|---|---|
| Corrector Lens (upper): | | | |
| Entrance Surface | 19,631 | .650 | 517–645. |
| Exit Surface | −62.700 | 1.792 | Air. |
| Corrector Lens (lower): | | | |
| Entrance Surface | −14.262 | .312 | 517–645. |
| Exit Surface | ±∞ | 6.353 | Air. |
| Primary Mirror | −18.000 | 7.878 | Air. |
| Filter: | | | |
| Entrance Surface | ±∞ | .250 | 517–645. |
| Exit Surface | ±∞ | .125 | Air. |
| Window (after filter): | | | |
| Entrance Surface | ±∞ | .120 | 517–645. |
| Exit Surface | ±∞ | .384 | Air. |
| Lens (by tube face): | | | |
| Entrance Surface | 1.954 | .250 | 517–645. |
| Exit Surface | 5.452 | .036 | Air. |
| Tube face: | | | |
| Entrance Surface | ±∞ | .075 | 487–700. |
| Exit Surface | ±∞ | .020 | Air. |

RETICLE PROJECTOR SYSTEM

| Component | Radius | Thickness | Glass Type |
|---|---|---|---|
| Reticle: | | | |
| Entrance Surface | ±∞ | .100 | 523–586. |
| Exit Surface | ±∞ | 6.303 | Air. |
| Lens (collimating): | | | |
| Entrance Surface | ±∞ | .159 | 523–586. |
| Intermediate Surface | −1.700 | .093 | 720–293. |
| Exit Surface | −2.702 | 3.045 | Air. |
| Prism (90° collimating): | | | |
| Entrance Surface | ±∞ | .600 | 517–645. |
| Exit Surface | ±∞ | 0.0 | Cement. |
| Lens (converging): | | | |
| Entrance Surface | ±∞ | .159 | 523–586. |
| Intermediate Surface | −1.700 | .093 | 720–293. |
| Exit Surface | −2.702 | 5.573 | Air. |

Filter, Window (after filter), Lens (by tube face), and Tube face values are given under Objective System above.

References Cited

UNITED STATES PATENTS 3,257,904 6/1966 Scidmore et al.
3,407,302 10/1968 Bouwers.

DAVID SCHONBERG, *Primary Examiner.*

P. R. GILLIAM, *Assistant Examiner.*

U.S. Cl. X.R.

350—10, 18, 34, 35